United States Patent [19]
Salo

[11] Patent Number: 5,492,351
[45] Date of Patent: Feb. 20, 1996

[54] AXLE CONSTRUCTION FOR A VEHICLE

[75] Inventor: Timo Salo, Karjaa, Finland

[73] Assignee: OY Sisu-Auto AB, Karjaa, Finland

[21] Appl. No.: 199,307

[22] PCT Filed: Sep. 21, 1992

[86] PCT No.: PCT/FI92/00246

§ 371 Date: Mar. 2, 1994

§ 102(e) Date: Mar. 2, 1994

[87] PCT Pub. No.: WO93/05968

PCT Pub. Date: Apr. 1, 1993

[30] Foreign Application Priority Data

Sep. 27, 1991 [FI] Finland ................................ 914568

[51] Int. Cl.$^6$ ........................................................ B60G 9/00
[52] U.S. Cl. ...................... 280/81.6; 180/24.01; 280/86; 280/718
[58] Field of Search ............................ 280/81.6, 86, 682, 280/686, 718, 676; 180/24.01

[56] References Cited

U.S. PATENT DOCUMENTS

| 915,733 | 3/1909 | Brillie | 180/24.01 |
|---|---|---|---|
| 2,732,220 | 1/1956 | Ward. | |
| 4,804,205 | 2/1989 | Parsons | 280/718 |
| 5,255,754 | 10/1993 | Lauronen | 280/81.6 |

FOREIGN PATENT DOCUMENTS

| 513041 | 8/1952 | Belgium | 280/686 |
|---|---|---|---|
| 12147696 | 3/1973 | Germany. | |
| 2902728 | 8/1980 | Germany | 280/81.6 |
| 19114587 | 10/1991 | WIPO. | |

Primary Examiner—Eric D. Culbreth
Attorney, Agent, or Firm—Ladas & Parry

[57] ABSTRACT

An axle construction for a vehicle has a rigid axle and wheels mounted at opposite ends of the rigid axle. Supports respectively at the opposite ends of the rigid axle respectively support opposite sides of a chassis frame of the vehicle from the rigid axle. A triangular support is journalled at one point centrally to the rigid axle and at two points to the opposite sides of the chassis frame and other, longitudinal supports are journalled to the rigid axle on opposite sides of the middle of the rigid axle for turning the rigid axle. The supports are attached to the rigid axle by joints which allow the rigid axle to turn in the horizontal plane relative to the supports and the supports to rock relative to the rigid axle.

4 Claims, 3 Drawing Sheets

AXLE CONSTRUCTION FOR A VEHICLE

The invention relates to an axle and bogie construction for a vehicle and, in particular, for lorries and trailers.

Rigid steering axles are used in especially heavy transports with twin wheels, as there are typically more than two such axles and as the turning radius of the vehicle is inadequate without steering. Rigid axles are used because of the heavy load and simple construction. It is also crucial that the load is evenly distributed on all axles in uneven terrain.

It is customary to use twin wheels supported by separate springs, in which case the construction meets both the turning and load distribution requirements.

It is also possible to use axles journalled fixedly to the frame by means of a turntable. The turning requirements are thereby met, whereas the load distribution requirements will not be fulfilled if there are several axles, since the support springs of the axles used in connection with the turntable are not interconnected.

Further, various load distribution arrangements comprising a number of trailers are known. A problem therewith is the poor manageability of the combinations.

It is also known to use twin wheels each supported by separate springs and each having a separate turntable and wheels that turn easily even through 180°. In this case, however, the wheels cannot be driven mechanically, wherefore hydraulic motors are used in most cases. This solution is both complicated and expensive.

Finnish patent application No. 901498 discloses an axle arranged to be turned by affecting the position of the longitudinal supports of the axle and the suspension rods of the springs. These arrangements succeed well in fulfilling the requirements set for the control of the turning behaviour of the axle, the distribution of the load and the interaction between successive axles in multiple-axle bogie constructions. In this construction, however, no long springs or other long support means can be used, because the support means turn together with the axles, and only relatively short support means have sufficient turning space. Owing to short support means, on the other hand, all components relating to axle suspension have to be disposed crampedly close to one another.

The object of the present invention is to resolve the above-mentioned problem and produce an advantageous effect on the loading of the components. This object is achieved by means of the axle construction of the invention.

This construction makes it possible that the support means or springs always remain parallel with the chassis frame of the vehicle, which thus enables the use of support means or springs of a desired length.

The bogie may comprise, and it normally does, more than two axles, and some of the axles may be dead, i.e. not steering. In general, at least one axle is a dead axle. At least the following alternatives are obvious:

A bogie formed by one steering axle and one dead axle. An equaliser lever is used and the support means of the dead axle is supported at one end to the equaliser lever by means of a suspension rod, its other end being supported to the chassis frame in the same or another manner.

A bogie formed by two steering axles and one dead axle. In this case, the dead axle may be positioned at either end of the bogie, whereby the situation is the same as above, except that the equaliser lever is used between the steering axles, or as the middle axle of the bogie, whereby the dead axle is sprung to both steering axles by means of equaliser levers.

A bogie formed by three steering axles and one dead axle.

A bogie formed by one steering axle and two dead axles.

A bogie formed by two steering axles and two dead axles.

A bogie formed by three steering axles and two dead axles.

A single steering axle, whereby the equaliser lever is omitted and the suspension rods are secured at the lower end to the points of attachment of the chassis frame. This alternative is not a bogie construction even though the axle support and control of the invention are utilised.

It is to be understood that other alternatives can be realised by means of the bogie arrangement of the invention as well.

In the following the invention will be described in greater detail by means of two specific embodiments with reference to the attached drawings, where FIG. 1a is a side view of a bogie construction of the invention;

FIG. 1b is a top view of the construction of FIG. 1a;

FIG. 1c is a rear view of the construction of FIG. 1a;

FIG. 2b is a top view of FIG. 2a; and

FIG. 3 illustrates a single-axle construction according to the invention as shown in FIG. 1a.

Figure 1A:
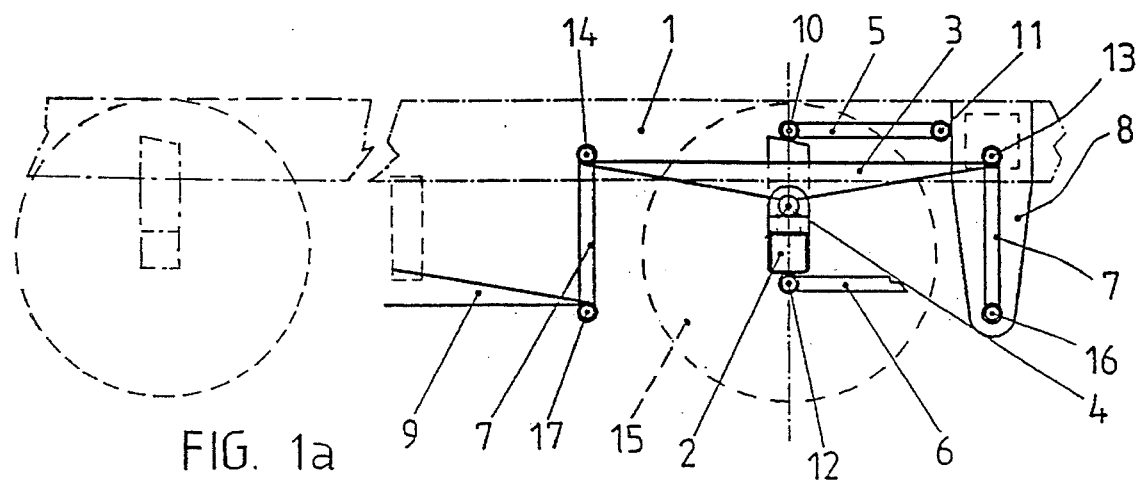
Figure 2A:
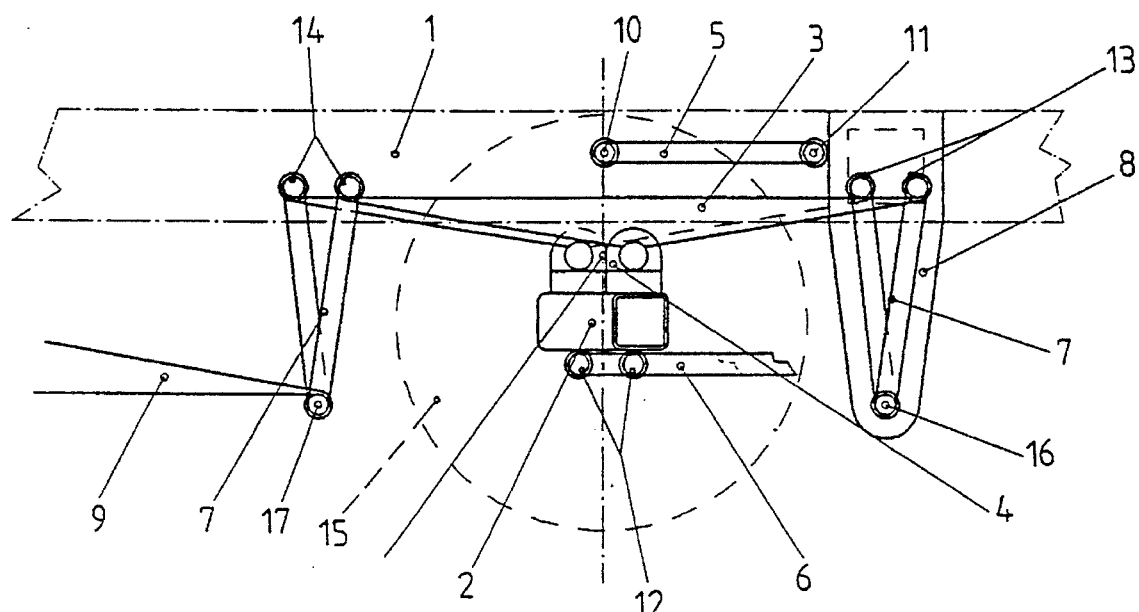
FIG. 2a is a side view of the construction of the preceding figures when the axle is in a turned position.
Figure 2B:
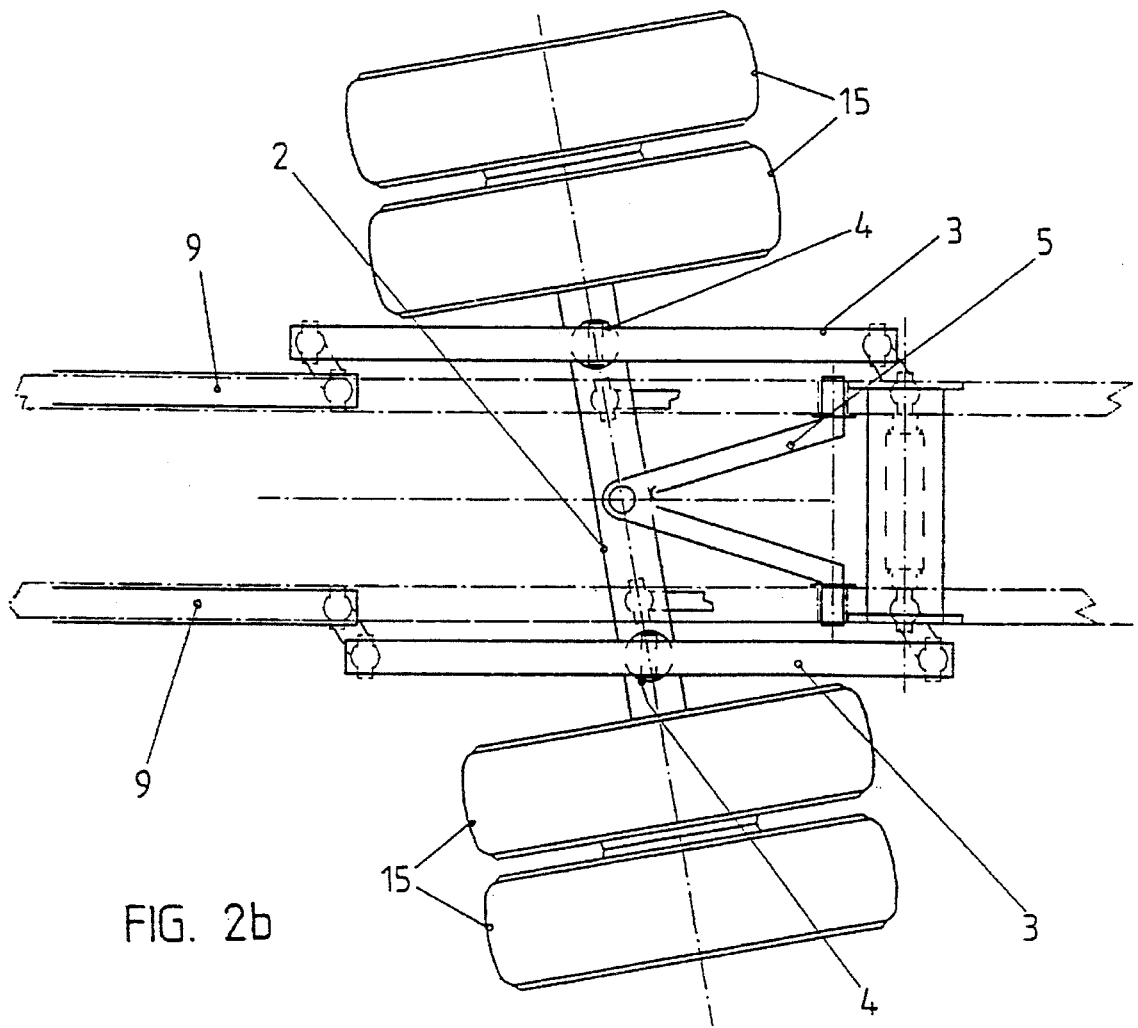

In FIGS. 1a and 2b, a rigid axle beam 2 may be the axle beam of a drive axle or an axle which is load-bearing only.

The wheels 15 at opposite ends of the axle beam usually are twin for heavy-load axles, but may also be single wheels.

A triangular support 5 is attached resiliently to a chassis frame 1 of a vehicle or journalled thereto by means of joints 11. It is also attached centrally to the upper side of an axle beam 2 by means of a ball joint 10. This way of support allows the axle beam 2 to move resiliently in the vertical direction or to pivot in the vertical plane, in addition to which it allows a steering pivoting movement in the horizontal plane, whereas it prevents the movement of the axle sidewardly of the vehicle.

Support means 3 between the axle beam 2 and opposite sides of the chassis frame 1, which may be rigid levers or springs, such as leaf springs or parabolic springs, are each attached centrally to the axle beam by means of joints 4 and, similarly at its longitudinally opposite, ends similarly to the upper end of suspension rods 7 by means of ball joints 13 and 14. The rearmost suspension rods are attached at their lower ends to the chassis frame 1 by means of ball joints 16 and the foremost suspension rods are attached similarly to the ends of equaliser levers 9 by means of ball joints 17.

The means used for turning the axle beam 2 may be for instance as disclosed in Finnish patent application No. 901498. The axle beam 2 turns around the attachment point (ball joint 10) of the triangular support 5 journalled thereto by moving back and forth longitudinal supports 6 on opposite sides of the chassis frame 1 and attached to the axle beam 2 by means of joints 12 on opposite sides of the middle thereof.

The joints 4 allow the axle beam 2 to turn in the horizontal plane (in the plane of FIGS. 1b and 2b) relative to support means 3 and the support means 3 to rock relative to the axle beam 2. The suspension rods 7 for their part are mounted symmetrically in relation to the chassis frame 1. This kind of securing of the support means 3 enables the use of long support means, because the support means always remains parallel to the chassis frame 1 when the axle beam turns.

The support means 3 tends to turn together with the axle beam 2 by the effect of joint friction, but the turning is resisted by force components which depend on the position of the suspension rods 7, operate at the ends of the support means, and are perpendicular to the longitudinal direction of the chassis frame 1. By the effect of said force components the support means 3 remains almost parallel to the chassis frame 1.

The support means 3 may be part of a turning multiple-axle bogie construction or the suspension construction of a single turning axle.

Figure 1B:
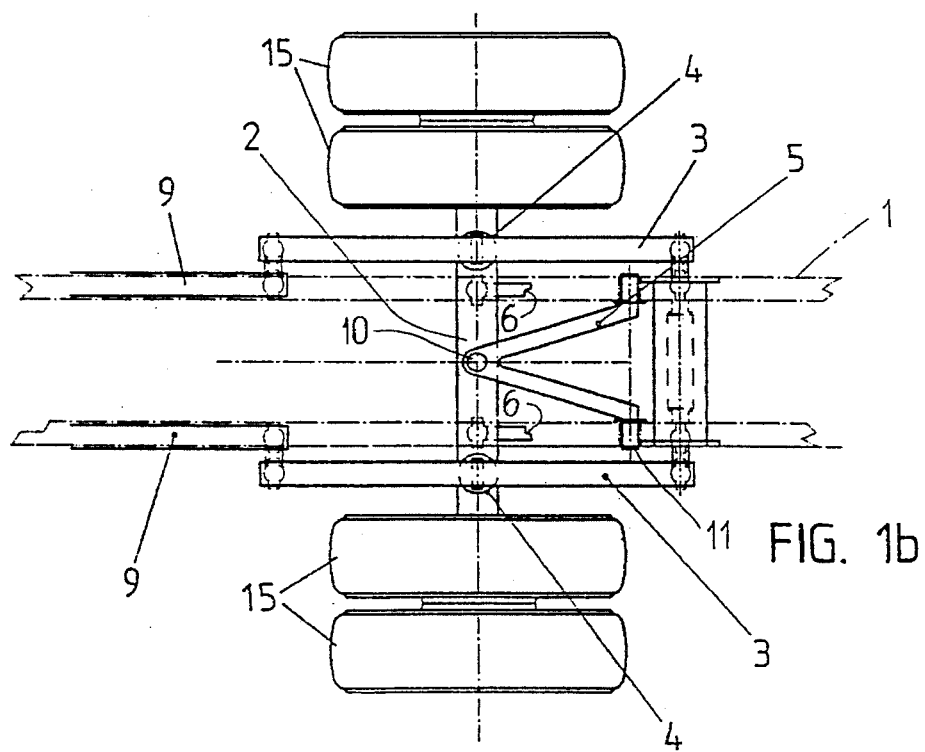
Figure 1C:
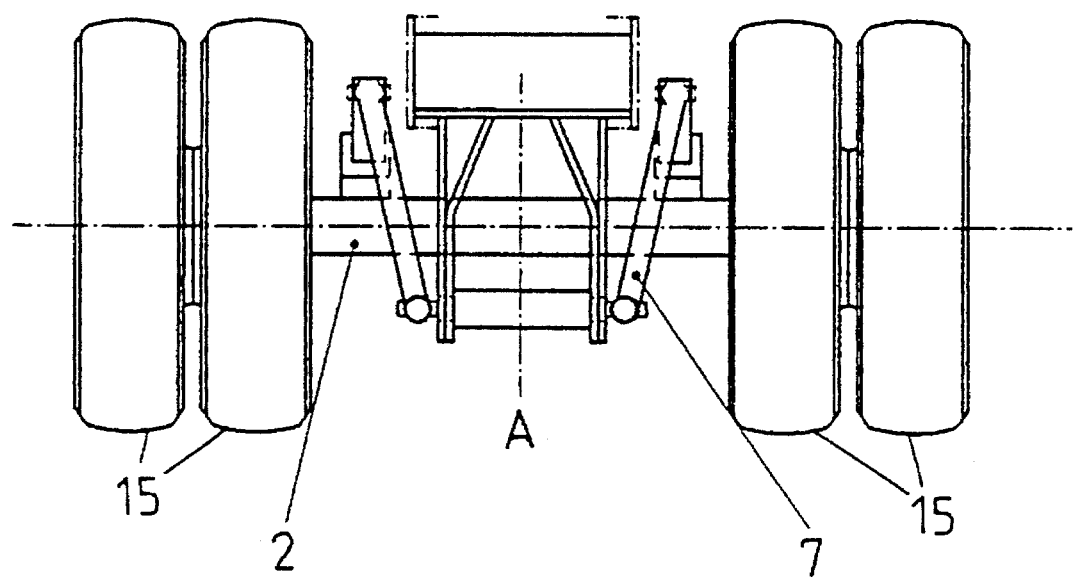

Securing which allows the turning of the support means in the plane of FIG. 1b may be realised in a number of ways. An axial bearing, a ball-like bearing or a resilient component allowing turning such as a rubber or helical spring, can be used.

During the turning, the suspension rods 7 are pivoted away from their vertical position as shown in FIGS. 2a and 2b, whereby the chassis frame 1 of the vehicle rises. The tendency of the rods 7 to return to the vertical position due to the weight of the vehicle causes the steering to be subjected to a moment which returns it to the position for driving straight ahead, which has a stabilising effect on the steering.

The equaliser levers are mounted similarly centrally on an equaliser lever axle (not shown) which is attached to the chassis frame 1.

The other end of the equaliser levers 9 is connected to the support means of another axle by means of joints (not shown) corresponding to joints 17 and other suspension rods (not shown), which other axle may be steering or non-steering. In addition, either one, neither or both of the axles of the bogie may be a driving axle, whereby the rest are merely load-bearing axles as shown in the figures.

The equaliser levers preferably distribute wheel loads between the axles interconnected by means of them. In cases where both bogie axles are driving, it is possible in the construction of the invention that the drive of the rearmost steering and driving axle is advantageously effected through a cardan shaft connected between the axles.

Figure 3:
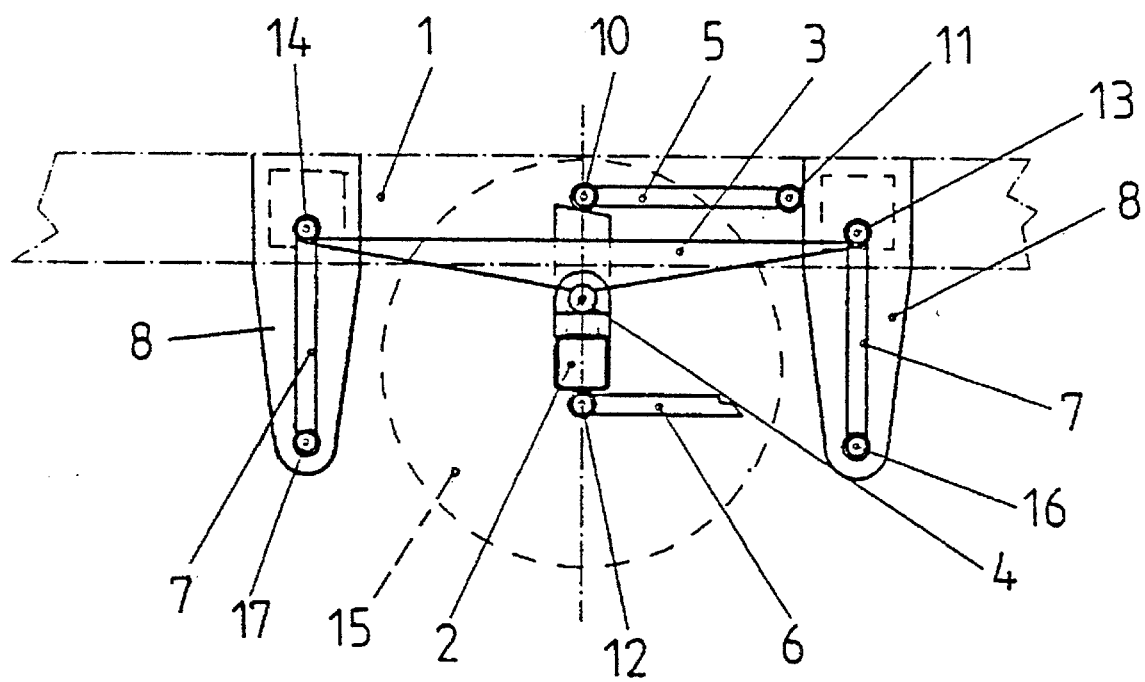

In a construction comprising a single axle (FIG. 3), which is steering, the equaliser levers are omitted as being unnecessary, and the suspension rods 7 are attached to the chassis frame 1 similarly to the rearmost suspension rods of FIGS. 1a and 1b by means of a support 8.

The arrangement of the invention has been described above by means of two exemplifying arrangements only, and it is to be understood that the invention may be modified without deviating from the scope of protection defined in the attached claims, and it can be applied in various axle constructions, of which only a few possible examples have been mentioned in the foregoing.

I claim:

1. An axle construction for a vehicle, comprising:

a rigid axle;

wheels mounted at opposite ends of the rigid axle;

support means respectively at the opposite ends of the rigid axle respectively for supporting opposite sides of a chassis frame of a vehicle from the rigid axle, each of the support means having substantially downwardly directed suspension rods respectively at front and back sides of the rigid axle for connection to the chassis frame of the vehicle;

a triangular support journalled at one point centrally to the rigid axle and having two points for journalling to the opposite sides of the chassis frame of the vehicle; and longitudinal supports journalled to the rigid axle on opposite sides of the middle of the rigid axle for turning the rigid axle;

wherein the support means are attached to the rigid axle by joints which allow the rigid axle to turn in the horizontal plane relative to the support means and the support means to rock relative to the rigid axle.

2. In a bogie construction for a vehicle, comprising:

at least two rigid axles;

wheels attached to opposite end of the respective rigid axles;

support means respectively at the opposite ends of the respective rigid axles for supporting a chassis frame of the vehicle from the rigid axles, at least one of the rigid axles being turnable and comprising;

a triangular support journalled at one point centrally to the one rigid axles and journalled at two points to opposite sides of the chassis frame of the vehicle; and longitudinal supports journalled to the one rigid axle on opposite sides of the middle thereof for turning of the one rigid axle;

each of the support means having two substantially downwardly directed suspension rods respectively on the front and rear sides of a respective one of the rigid axles respectively for connection to the chassis frame of the vehicle and an equaliser lever for connection to the chassis frame of the vehicle and a suspension rod of another of the support means, the improvement wherein at least one of the support means is secured to one of the rigid axles by means of joints for allowing the one of the rigid axles to turn in the horizontal plane relative to the one of the support means and the one of the rigid axles, and at least the suspension rods for the one of the rigid axles are symmetrical in relation to the chassis frame of the vehicle.

3. An axle construction for a vehicle, comprising:

a rigid axle;

wheels mounted at opposite ends of the rigid axle;

support means respectively at the opposite ends of the rigid axle respectively for supporting opposite sides of a chassis frame of a vehicle from the rigid axle, each of the support means having suspension rods respectively at front and back sides of the rigid axle for connection to the chassis frame of the vehicle;

a support journalled at one point centrally to the rigid axle and having two points for journalling to the opposite sides of the chassis frame of the vehicle; and longitudinal supports journalled to the rigid axle on opposite sides of the middle of the rigid axle for turning the rigid axle;

wherein the support means are attached to the rigid axle by joints which allow the rigid axle to turn in the horizontal plane relative to the support means.

4. In a bogie construction for a vehicle, comprising:

at least two rigid axles;

wheels attached to opposite ends of the respective rigid axles;

support means respectively at the opposite ends of the respective rigid axles for supporting a chassis frame of the vehicle from the rigid axles, at least one of the rigid axles being turnable and comprising:

a support journalled at one point centrally to the one rigid axle and journalled at two points to opposite sides of the chassis frame of the vehicle; and longitudinal supports journalled to the one rigid axle on opposite sides of the middle thereof for turning of the one rigid axle;

each of the support means having two suspension rods respectively on the front and rear sides of a respective one of the rigid axles respectively for connection to the chassis frame of the vehicle and an equaliser lever for connection to the chassis frame of the vehicle and a suspension rod of another of the support means, the improvement wherein the support means are secured to the respective rigid axles by means of joints which allow the rigid axles to turn in the horizontal plane relative to the respective support means.

* * * * *